United States Patent
Sabolsky et al.

(10) Patent No.: US 10,087,531 B2
(45) Date of Patent: Oct. 2, 2018

(54) IMPREGNATION PROCESS USING A BIO-TEMPLATING METHOD FOR NANO-CATALYST INCORPORATION INTO THE ELECTRODES OF SOLID-STATE ELECTROCHEMICAL CELLS

(71) Applicant: West Virginia University, Morgantown, WV (US)

(72) Inventors: Edward M. Sabolsky, Morgantown, WV (US); Ozcan Ozmen, Morgantown, WV (US); John W. Zondlo, Albright, WV (US)

(73) Assignee: West Virginia University, Morgantown, WV (US)

( * ) Notice: Subject to any disclaimer, the term of this patent is extended or adjusted under 35 U.S.C. 154(b) by 151 days.

(21) Appl. No.: 14/963,564

(22) Filed: Dec. 9, 2015

(65) Prior Publication Data
US 2016/0172683 A1    Jun. 16, 2016

Related U.S. Application Data (60) Provisional application No. 62/089,943, filed on Dec. 10, 2014.

(51) Int. Cl.
*H01M 4/88*    (2006.01)
*C25B 11/03*   (2006.01)
(Continued)

(52) U.S. Cl.
CPC .............. *C25B 1/04* (2013.01); *C25B 11/035* (2013.01); *H01M 4/8846* (2013.01);
(Continued)

(58) Field of Classification Search
CPC .. H01M 4/8605; H01M 4/8846; C25B 11/035
See application file for complete search history.

(56) References Cited

U.S. PATENT DOCUMENTS

| | | | |
|---|---|---|---|
| 2004/0031679 A1* | 2/2004 | Venkatesan | H01M 4/8636 204/280 |
| 2008/0155813 A1* | 7/2008 | Dopp | H01M 4/8605 29/623.5 |

(Continued)

OTHER PUBLICATIONS

Long, R.Q. et al., Sulfur Tolerant Magnesium Nickel Silicate Catalyst for Reforming of Biomass Gasification Products to Syngas, Catalysts, 2012, pp. 264-280, 2.

(Continued)

*Primary Examiner* — Jonathan G Leong
*Assistant Examiner* — Christopher P Domone
(74) *Attorney, Agent, or Firm* — Buchanan Ingersoll & Rooney PC; Craig G. Cochenour, Esq.

(57) ABSTRACT

A process for incorporating a nanocatalyst on the surface of and within the pores of an electrode comprising subjecting an electrode to a singular template impregnation to form a treated electrode having a bio-template layer; and then subjecting the treated electrode to a singular nano-catalyst impregnation for tethering the nano-catalyst to the treated electrode; and then removing the bio-template layer by performing thermolysis upon the treated electrode for forming a nano-catalyst bonded on the surface and within the pores of the electrode. A modified electrode or product made by this process is provided.

18 Claims, 5 Drawing Sheets

(51) Int. Cl.
H01M 8/12 (2016.01)
C25B 1/04 (2006.01)
H01M 8/1246 (2016.01)
H01M 8/124 (2016.01)

(52) U.S. Cl.
CPC ....... *H01M 4/8882* (2013.01); *H01M 8/1246* (2013.01); *H01M 2008/1293* (2013.01); *Y02E 60/366* (2013.01); *Y02E 60/525* (2013.01); *Y02P 70/56* (2015.11)

(56) References Cited

U.S. PATENT DOCUMENTS

2015/0255802 A1* 9/2015 Kim ............... H01M 4/926
429/524
2015/0364784 A1* 12/2015 Babanova ............ H01M 8/16
429/401

OTHER PUBLICATIONS

Rembeza, S.I. et al., Synthesis of Compositionally Different Multicomponent Metal-Oxide Films (SnO2)x(znO)1-x (x=1-0.5), Semiconductors, 2014, pp. 1118-1122, 48(8), Pleiades.
Lund, A. et al., The Effect of Loading and Particle Size on the Oxygen Reaction in CGO Impregnated Pt Electrodes, J. Solid State Electrochem, 2012, pp. 1161-1168, 16, Springer.
Rossmeisl, J. et al., Trends in Catalytic Activity for SOFC Anode Materials, Solid State Ionics, 2008, pp. 1694-1700, 178, Elsevier B.V.
Villegas, L. et al., Wet Impregnation of Alumina-Washcoated Monoliths: Effect of the Drying Procedure on Ni Distribution and on Autothermal Reforming Activity, Applied Catalysis A: General, 2007, pp. 43-55, 320, Elsevier B.V.
Yasutake, H. et al., Improved Performance of Nickel / Gadolinium-Doped Ceria Anode by Infiltration of Proton Conductor (SrCe0.95Yb0.05O3-a) in Hydrogen and Dry Methane Fuels, 2009, pp. 273-285, 16 (51), The Electrochemical Society.
Zheng, L. et al. Contolled Preparation of Titania Nanofilm by a Template of Polydopamine Film and its Reversible Wettability, Thin Solid Films, 2012, pp. 2776-2780, 520, Elsevier B. V.
Lee, H. et al., Mussel-Inspired Surface Chemistry for Multifunctional Coatings, Science New Series, 2007, pp. 426-430, vol. 318, No. 5849, American Association for the Advancement of Science.
Gorte, R.J. et al., Novel SOFC Anodes for the Direct Electrochemical Oxidation of Hydrocarbon, Journal of Power Sources, 2002, pp. 10-15,106, Elsevier Science B.V.
Sholklapper, T.Z. et al., Synthesis of Dispersed and Contiguous Nanoparticles in Solid Oxide Fuel Cell Electrodes, 2008, Fuel Cells 08, 2008, pp. 303-312, No. 5, Wiley-VCH Verlag GmbH & Co. KGaA, Weinheim.
Fengqiu, T. et al., Effect of Dispersants on Surface Chemical Properties of Nano-Zirconia Suspensions, Ceramics International, 2000, pp. 93-97, 26, Elsevier Science Ltd and Techna S.r.l.
Liu, Z. et al., Effect of Impregnation Phases on the Performance of Ni-based Anodes for Low Temperature Solid Oxide Fuel Cells, Journal of Power Sources, 2011, pp. 8561-8567, 196, Elsevier B.V.
Timurkutluk, B. et al., Anode-Supported Solid Oxide Fuel Cells with Ion Conductor Infiltration, 2011, pp. 1048-1055, 35, John Wiley & Sons, Ltd.
Ryou, M-H. et al., Mussel-Inspired Polydopamine-Treated Polyethylene Separators for High-Power Li-Ion Batteries, Advanced Materials, 2011, pp. 3066-3070, 23, Wiley-VCH Verlag GmbH & Co., KGaA, Weinheim.
Wu, Ch. et al., Mussel-Inspired Porous SiO2 Scaffolds with Improved Mineralization and Cytocompatibility for Drug Delivery and Bone Tissue Engineering, Journal of Materials Chemistry, 2011, pp. 18300-18307, 21, The Royal Society of Chemistry 2011.

Ata, M.S. et al., A Review of New Methods of Surface Chemical Modification, Dispersion and Electrophoretic Deposition of Metal Oxide Particles, RSC Advances, 2014, pp. 22716-22732, 4, The Royal Society of Chemistry.
Liu, Y. et al., Polydopamine and Its Derivative Materials: Synthesis and Promising Applications in Energy, Environmental, Biomedical Fields, Chemical Reviews, 2014, pp. 5057-5115, 114, American Chemical Society.
Ku, S. H. et al., Human Endothelial Cell Growth on Mussel-Inspired Nanofiber Scaffold for Vascular Tissue Engineering, Biomaterials, 2010, pp. 9431-9437, 31, Elsevier Ltd.
Tsai, W-B. et al., Poly(dopamine) Coating of Scaffolds for Articular Cartilage Tissue Engineering, Acta Biomaterialia, 2011, pp. 4187-4194, 7, Elsevier Ltd.
Ko, E. et al., Polydopamine-Assisted Osteoinductive Peptide Immobilization of Polymer Scaffolds for Enhanced Bone Regeneration by Human Adipose-Derived Stem Cells, BioMacromolecules, 2013, pp. 3202-3213, 14, American Chemical Society.
Yang, K. et al., Polydopamine-Mediated Surface Modification of Scaffold Materials for Human Neural Stem Cell Engineering, Biomaterials, 2012, pp. 6952-6964, 33, Elsevier Ltd.
Xi, Z-Y. et al., A Facile Method of Surface Modification for Hydrophobic Polymer Membranes Based on the Adhesive Behavior of Poly(DOPA) and Poly(Dopamine), Journal of Membrane Science, 2009, pp. 244-253, 327, Elsevier B.V.
Clodt, J.I. et al., Double Stimuli-Responsive Isoporous Membranes via Post-Modification of pH-Sensitive Self-Assembled Diblock Copolymer Membranes, Advanced Functional Materials, 2013,pp. 731-738, 23, WILEY-VCH Verlag GmbH & Co. KGaA, Weinheim.
Pan, F. et al., Bioinspired Fabrication of High Performance Composite Membranes with Ultrathin Defect-Free Skin Layer, Journal of Membrane Science, 2009, pp. 279-285, 341, Elsevier B. V.
Hong, S. et al., Non-Covalent Self-Assembly and Covalent Polymerization Co-Contribute to Polydopamine Formation, Advanced Functional Materials, 2012, pp. 4711-4717, 22, WILEY-VCH Verlag GmbH & Co. KGaA, Weinheim.
Vei, Q. et al., Oxidant-Induced Dopamine Polymerization for Multifunctional Coatings, Polymer Chemistry, 2010, pp. 1430-1433, 1, The Royal Society of Chemistry.
Yang, H. et al., Polydopamine-Coated Nanofibrous Mats as a Versatile Platform for Producing Porous Functional Membranes, Journal of Materials Chemistry, 2012, pp. 16994-17001, 22, The Royal Society of Chemistry.
Yu, B. et al., Robust Polydopamine Nano/Microcapsules and Their Loading and Release Behavior, Chem. Commun., 2009, pp. 6789-6791, The Royal Society of Chemistry.
Li, X. et al., Deformation and Reinforcement of Thin-Film Composite (TFC) Polyamide-imide (PAI) Membranes for Osmotic Power Generation, Journal of Membrane Science, 2013, pp. 204-217, 434, Elsevier B. V.
Jiang, San Ping, A Review of Wet Impregnation—An Alternative Method for the Fabrication of High Performance and Nano-Structured Electrodes of Solid Oxide Fuel Cells, Materials Science and Engineering A, 2006, pp. 199-210, 418, Elsevier B.V.
Corre, G. et al., Activation and Ripening of Impregnated Manganese Containing Pervskite SOFC Electrodes Under Redox Cycling, Chem. Mater, 2009, pp. 1077-1084, 21, American Chemical Society.
Ding, A et al., An Octane-Fueled Low Temperature Solid Oxide Fuel Cell with Ru-Free Anodes, Electrochemistry Communications, 2008, pp. 1295-1298, 10,Elsevier B.V.
Babaei, A. et al., Pd-Promoted (La, Ca) (Cr,Mn)O3/GDC Anode for Hydrogen and Methane Oxidation Reactions of Solid Oxide Fuel Cells, Solid State Ionics, 2010, pp. 1221-1228, 181, Elsevier B.V.
Moulijn, J.A., et al., Catalyst Deactivation: Is It Predictable? What to Do?, Applied Catalysis A: General, 2001, pp. 3-16, 212, Elsevier Science B.V.
Zhu, W. et al., Ceria Coated Ni as Anodes for Direct Utiliazation of Methane in Low-Temperature Solid Oxide Fuel Cells, Journal of Power Sources, 2006, pp. 897-902, 160, Elsevier B.V.
Mekhilef, S. et al., Comparative Study of Different Fuel Cell Technologies, Renewable and Sustainable Energy Reviews, 2012, pp. 981-989, 16, Elsevier Ltd.

(56) References Cited

OTHER PUBLICATIONS

Zhang, L. et al., Effect of Impregnation of Sm-Doped $CeO_2$ in NiO/YSZ Anode Substrate Prepared by Gelcasting for Tubular Solid Oxide Fuel Cell, Journal of Alloys and Compounds, 2009, pp. 168-172, 482, Elsevier B.V.

Boaro, M. et al., Effect of Redox Treatments on $Ce0.5O2$ Based Solid Oxide Fuel Cell Anodes, Journal of Power Sources, 2014, pp. 79-91, 270, Elsevier B.V.

Lin, X. et al., Effect of Samarium Doped Ceria Nanoparticles Impregnation on the Performance of Anode Supported SOFC with $(Pr0.7Ca0.3)0.9MnO3-\delta$ cathode, Journal of Rare Earths, 2010, pp. 96-99, 28, No. 1, Elsevier.

Babaei, A. et al., Electrocatalytic Promotion of Palladium Nanoparticles on Hydrogen Oxidation on Ni/GDC Anodes of SOFCs via Spillover, Journal of the Electrochemical Society, 2009, pp. B1022-B1029, 156(9), The Electrochemical Society.

Zhu, W. et al., Enhancement in Three-Phase Boundary of SOFC Electrodes by an Ion Impregnation Method: A Modeling Comparison, Electrochemical and Solid State Letters, 2008, pp. B83-B86, 11, The Electrochemical Society.

Zhou, Y. Y et al., Evaluation of Ni and $Ni-Ce0.8Sm0.2O2-\delta$ (SDC) Impregnated 430L Anodes for Metal-Supported Solid Oxide Fuel Cells, Journal of Power Sources, 2014, pp. 117-122, 267, Elsevier B.V.

McIntosh, S. et al., Effect of Precious-Metal Dopants on SOFC Anodes for Direct Utilization of Hydrocarbons, Electrochemical and Solid-State Letters, 2003, pp. A240-A243, 6 (11), The Electrochemical Society.

Park, S. et al., Tape Cast Solid Oxide Fuel Cells for the Direct Oxidation of Hydrocarbons, Journal of the Electrochemical Society, 2001, pp. A443-A447, 148 (5), The Electrochemical Society.

Ding, D. et al., High Performance Electrolyte-Coated Anodes for Low-Temperature Solid Oxide Fuel Cells: Model and Experiments, Journal of Power Sources, 2008, pp. 177-185, 179, Elsevier B.V.

Chen, T. et al., Impregnated $Nd2NiO4+\delta$ Scandia Stabilized Zirconia Composite Cathode for Intermediate-Temperature Solid Oxide Fuel Cells, Journal of Power Sources, 2014, pp. 812-817, 269, Elsevier B.V.

Solis, C. et al., Catalytic Surface Promotion of Highly Active $La0.85Sr0.15Cr0.8Ni0.2O3-\delta$ Anodes for $La5.6WO11.4-\delta$ Based Proton Conducting Fuel Cells, Applied Catalysis B: Environmental, 2014, pp. 203-207, 147, Elsevier B.V.

Huang, Y. et al., SOFC Cathodes Prepared by Infiltration with Various LSM Precursors, Electrochemical and Solid-State Letters, 2006, pp. A237-A240, 9 (5), The Electrochemical Society.

Torknik, F.S. et al., Microstructural Refinement of $Ni/Ce0.8Gd0.2O2-\delta$ Anodes for Low-Temperature Solid Oxide Fuel Cell by Wet Infiltration Loading of $PdCl2$, Ceramics International, 2014, pp. 12299-12312, 40, Elsevier Ltd and Techna Group S.r.l.

Minh, N.Q. et al., Ceramic Fuel Cells, Journal of the American Ceramic Society, 1993, pp. 563-588, 76 (3).

Jiang, Z. et al., Nano-Structured Composite Cathodes for Intermediate-Temperature Solid Oxide Fuel Cells via an Infiltration /Impregnation Technique, Electrochimica Acta, 2010, pp. 3595-3605, 55, Elsevier Ltd.

Niemann, M.U. et al., Nanomaterials for Hydrogen Storage Applications: A Review, Journal of Nanomaterials, 2008, pp. 1-9, Hindawi Publishing Company.

Jiang, S.P. et al., Nanoscale and Nano-Structured Electrodes of Solid Oxide Fuel Cells by Infiltration: Advances and Challenges, International Journal of Hydrogen Energy, 2012, pp. 449-470, 37, Elsevier Ltd.

Chen, Y. et al., Performance Enhancement of Ni-YSZ Electrode by Impregnation of $Mo0.1Ce0.9O2+\delta$, Journal of Power Sources, 2012, pp. 40-45, 204, Elsevier B.V.

Luczak, T., Preparation and Characterization of the Dopamine Film Electrochemically Deposited on a Gold Template and Its Applications for Dopamine Sensing in Aqueous Solution, Electrochimica Acta, 2008, pp. 5725-5731, 53, Elsevier Ltd.

Lu, C. et al., LSM-YSZ Cathodes with Reaction-Infiltrated Nanoparticles, Journal of the Electrochemical Society, 2006, pp. A1115-A1119, 153, The Electrochemical Society.

* cited by examiner

IMPREGNATION PROCESS USING A BIO-TEMPLATING METHOD FOR NANO-CATALYST INCORPORATION INTO THE ELECTRODES OF SOLID-STATE ELECTROCHEMICAL CELLS

CROSS REFERENCE TO RELATED APPLICATION

This utility patent application claims the benefit of priority to U.S. Provisional patent Application Ser. No. 62/089,943, filed Dec. 10, 2014. The entire contents of U.S. Provisional Patent Application Ser. No. 62/089,943 is incorporated by reference into this utility patent application as if fully rewritten herein.

STATEMENT REGARDING FEDERALLY SPONSORED RESEARCH OR DEVELOPMENT

This invention was made with government support under Grant No. RES 1000023 TRN 243 awarded by the United States of America Department of Energy, NETL RUA Program. The government has certain rights in the invention.

BACKGROUND OF THE INVENTION

1. Field of the Invention

This invention relates to an impregnation process using a bio-templating method for nano-catalyst incorporation into the electrode(s) of a solid-state electrochemical cell. This technology more specifically provides an infiltration protocol based on the incorporation of organic bio-templating agent which assistances in the homogenous deposition of inorganic oxide nano-catalyst within a porous electrode(s) of a solid-state electrochemical cell.

2. Brief Description of the Background Art

In the fuel cell art, solid oxide fuel cells (SOFC) and solid oxide electrolysis cells (SOEC) have been improved by modification of their electrodes (anode/cathode) by impregnation (infiltration) of the pores of the electrode materials with nanoparticles. Such a modification allows for added catalytic function and enhancement of electronic/ionic conduction pathways which result in improved cell performance and reliability, and provide for an increase in the amount of triple phase boundaries (TPB) for both electrodes allowing for a decrease in polarization resistance and a subsequent increase in the kinetic performance of the fuel cell.

In the literature, three prominent impregnation methods that have been assessed so far (Sholklapper et al., Fuel Cells, 2008). Those are nano-particle suspension/dispersion infiltration, molten salt infiltration and metal salt precipitation.

Nano-particle suspension is the least preferred method and only applicable for highly porous and opened structured electrodes. In this method, nano-catalyst particles are dispersed in a suspension and impregnated into the electrode. One challenge is that in liquid medium, the surface of nano-particles are charged and the surface chemical properties are influenced by many factors, such as the nature of the ceramic particles, particle size distribution, surface impurities, solvent and pH value etc. (Fengqiu et al., Ceram. Int., 2000). This factor brings nano-particle agglomeration problems which decreases the effectiveness of the protocol.

On the other hand, the molten salt method permits the impregnation at a very high concentration level (measured in grams per impregnation step). Typically for this process, the inorganic salt is melted in an inert atmosphere (~100-150° C.), and the processes often requires vacuum or pressure assistance to remove residual gas within the porosity and to force the highly viscous melt into the microstructure. Due to the viscosity issues and the localized non-homogenous deposition, pore clogging and gas diffusion problems were identified. It is noted that for both methods discussed above, the electrode itself acts as a filter in this method that inhibits homogenous deposition down the deep regions of electrodes which often leads to pore clogging and gas starvation issues (Sholklapper et al., Fuel Cells, 2008). Moreover, controlling the deposition kinetics and decreasing the number of infiltration cycles/steps, and lowering the time and labor are the basic challenges.

The last method, metal salt precipitation, is the most performed and preferred way of infiltration/impregnation of nano-catalyst into electrode microstructures. In this method, the catalyst salt, mostly nitrate and chloride salts, is dissolved into a liquid medium. Typically, an aqueous 0.05 M to 5 M salt solution is then introduced to the top of the electrode surface. In conventional "dripping method", this step is performed in multiple repetitions to achieve a specific mass loading of the nano-catalyst within the microstructure. Moreover, due to the fast drying conditions of small amount of precursor, the liquid pulls the free cation to the near surface site, and hence, most of the nano-catalyst portion is and localized near the surface region after firing.

SUMMARY OF THE INVENTION

The present invention provides a process for incorporating (depositing) mono or multi-cation nano-catalyst into the electrodes of an electrochemical cell (such as solid-oxide fuel cells (SOFCs) or solid-oxide electrolysis cells (SOECs)).

The present invention provides a impregnation process which includes a singular template impregnation step and a singular nano-catalyst impregnation step (bio-template assisted coating process). In the singular template impregnation step a catechol based bio-molecule, such as for example, but not limited to a poly-dopamine and poly-norepinephrine) is impregnated into the pores of the electrode material and attaches deep within the electrode. Not being bound by any particular theory, for example, this singular template impregnation step impregnates the bio-molecule via a coordination reaction between the catechol group and metal ions on the electrodes inner surface, forming a coordination complex (forming a bio-template layer in the pores). The process of this invention then includes a single nano-catalyst impregnation step whereby dissolved catalyst ions impregnate the pores of the electrode and attach to the ligand portion of the previously formed coordination complex via chelation. Thus the nano-catalyst becomes tethered to the deep inner walls of the pores of the electrodes. The bio-template is then removed via thermolysis and the nano-catalyst is bonded to the electrode pore walls via sintering.

In a preferred embodiment of this invention, the process, as described herein, is carried out on the entirety of the electrode(s) or cells. By performing the bio-template assisted dip coating on the entirety of the three dimensional electrode, it is possible to coat a larger surface area with a homogeneous thin film nano-catalyst. This leads to obviating the background art's nano-particulate clustering problems.

In one embodiment of the invention, a process incorporates at least one nanocatalyst on the surface of and within a plurality of pores of an electrode by impregnating an electrode comprising pores with a plurality of catechol-based biomolecules to form a treated electrode having a bio-template layer; and then impregnating the treated electrode with at least one nano-catalyst; and then removing the bio-template layer by performing thermolysis upon the treated electrode for forming at least one nano-catalyst bonded on the surface and within the pores of the electrode.

In some embodiments, the electrode is impregnated with the plurality of catechol-based biomolecules by dipping the electrode into a solution comprising the plurality of catechol-based biomolecules.

In some embodiments, the electrode is impregnated with the plurality of catechol-based biomolecules by dripping a solution comprising the plurality of catechol-based biomolecules into the pores of the electrode.

In some embodiments, the treated electrode is rinsed with a solvent after the treated electrode is impregnated with the plurality of catechol-based biomolecules and before the treated electrode is impregnated with the at least one nano-catalyst.

In some embodiments, the treated electrode is impregnated with the at least one nano-catalyst by dipping the treated electrode into a salt solution comprising the at least one nano-catalyst.

In some embodiments, the treated electrode is impregnated with the at least one nano-catalyst by dripping a salt solution comprising the at least one nano-catalyst into the pores of the electrode.

In some embodiments, the treated electrode is impregnated with the at least one nano-catalyst and before the bio-template layer is removed from the treated electrode, the treated electrode is dried.

In some embodiments, the thermolysis is performed at a temperature that is less than about 1000 degrees Centigrade.

In some embodiments, the only impregnation steps are impregnating the electrode comprising pores with the plurality of catechol-based biomolecules to form the treated electrode having the bio-template layer; and then impregnating the treated electrode with the at least one nano-catalyst.

In some embodiments, the plurality of catechol-based biomolecules comprises poly-dopamine.

In some embodiments, the plurality of catechol-based biomolecules comprises poly-epinephrine.

In some embodiments, the plurality of catechol-based biomolecules comprises melanin.

In some embodiments, the plurality of catechol-based biomolecules comprises at least one selected from the group consisting of poly-dopamine, poly-epinephrine, and melanin.

In some embodiments, the plurality of catechol-based molecules comprise a compound that behaves like poly-dopamine and is selected from the group consisting of caffeic acid, DHC (d 3,4-dihydroxyhydrocinnamic acid), Tiron (4,5-dihydroxy-1,3 benzenedisulfonic acid disodium salt), gallic acid and celestine blue.

In some embodiments, the plurality of catechol-based biomolecules comprises at least one selected from the group consisting of poly-dopamine, poly-epinephrine, and melanin.

In some embodiments, the electrode is impregnated with from about 0.25 mg/ml to about 5 mg/ml loading of the plurality of catechol-based biomolecules, and preferably the electrode is impregnated with from about 0.5 mg/ml to about 2 mg/ml loading of the plurality of catechol based biomolecules.

In some embodiments, the electrode is impregnated with from about 0.5 mg/ml to about 1 mg/ml loading of the plurality of catechol-based biomolecules.

In some embodiments, the electrode is impregnated with about 0.5 mg/ml loading of the plurality of catechol-based biomolecules.

In some embodiments, the treated electrode is impregnated with from 0.2 mg to 10 mg loading of all of the at least one nano-catalyst.

In some embodiments, the treated electrode is impregnated with from 0.5 mg to 7 mg loading of all of the at least one nano-catalyst.

In another embodiment of the invention, an electrode comprises a plurality of pores and at least one nanocatalyst, wherein the at least one nanocatalyst is bonded on the surface and within the pores of the electrode by impregnating the electrode with a plurality of catechol-based biomolecules to form a treated electrode having a bio-template layer; and then impregnating the treated electrode with the at least one nano-catalyst; and then removing the bio-template layer by performing thermolysis upon the treated electrode.

In some embodiments, the electrode is loaded with from 0.2 mg to 10 mg of all of the at least one nano-catalyst.

In some embodiments, the plurality of catechol-based biomolecules comprises at least one selected from the group consisting of poly-dopamine, poly-epinephrine, and melanin.

DETAILED DESCRIPTION OF THE INVENTION

The present invention provides a process for incorporating (depositing) mono or multi-cation nano-catalyst into the electrodes of an electrochemical cell (such as solid-oxide fuel cells (SOFCs) or solid-oxide electrolysis cells (SOECs)).

This method focuses on a facile wet impregnation deposition protocol (i.e. deposition process) to incorporate nano-catalyst homogenously throughout the porous three-dimensional electrodes. The method permits the deposition into a singular electrode or simultaneous deposition into both electrodes (anode and cathode). The deposition process is dependent upon a wet salt solution (where the medium may be water, alcohol, or organic liquid) being infiltrated into the solid porous electrode microstructure, where the solubility is altered and the inorganic catalyst is precipitated and deposited. The term "impregnation" (or sometime "infiltration") is utilized to emphasize the point that the nano-catalyst must be deposited within the interior of the porous electrode (all the way to the electrolyte surface within the interior of the cell), and not to be only deposited at the outer surface of the electrode.

An advantage of the process is that it lowers the processing time and labor needed to complete the impregnation task; the process requires only two deposition steps (with only one drying step), where previously demonstrated processes described in literature require greater than two steps (deposition and drying). The first step includes a single deposition step of the bio-template material; without drying, the electrochemical cell may be then exposed to the inorganic salt solution.

A second advantage is that the impregnation process permits precise control of the nano-catalyst concentration level throughout the microstructure. This means that the deposition rate can be controlled to a predictable level, where then the nano-catalyst incorporation concentration would be dependent upon the exposure time to the solution and not due to the number of deposition steps.

For a general description of the technology, the process includes the initial impregnation (infiltration) of a catechol-based molecules (for example, but not limited to, poly-dopamine and poly-norepinephrine. which is a biological chemical found in animals and humans) dissolved within an aqueous solution buffered to a constant pH. The catechol-based biomolecules are the key component of the technology, since this chemistry was found to adsorb and modify the chemistry of any surface (organic, metal, ceramic, and semiconductor). The chemical properties of this surface modifier also permit the controlled deposition (templating) of metal and metal oxide films over the bio-molecule; as we called bio-template layer.

The electrochemical cell with the porous electrodes is dipped into the dopamine solution or, dopamine solution is dripped on to the porous electrodes surface and held for a specific time to control the deposition and adhesion of the poly-catechol on the electrode interior surface. The thickness of this surface modifying agent will depend upon the concentration of the monomer solution, pH, and deposition time. The electrochemical cell is then dipped into a separate salt solution (containing the inorganic salt that will dictate the nano-catalyst composition) or salt solution is dripped on to the porous electrodes and held within the solution for a given specific time. The hold processing time will dictate the thickness of the deposited polycrystalline film of the nano-catalyst material within the porous electrode microstructure. After drying, the electrochemical cell is thermally processed to oxidize, and drive any desired solid-state reaction of deposited material. The key is to thermally process at a temperature less than about 1000° C. (centigrade) to control the particle size of the nano-catalyst deposits (to restrict sintering and grain growth processes). Minimum firing temperature depends on the decomposition temperature of catalyst precursor solution but the key is to thermally process at a temperature of <1000° C. to control the particle size of the nano-catalyst deposits.

The initial demonstrations of the technology utilized a dip-coating method to deposit both the bio-template and inorganic salt solution. A point deposition process (such as the use of a pipet or syringe) maybe used to deposit the poly-catechol and metal salt solutions at a specific location or across the whole electrode surface. This process is usually termed as a "dripping method". The dip-coating protocol was initially adapted for the demonstrations since the entire electrode surface (both electrodes if desired) can be exposed to the solution at the same time; in addition, the porous structure may be exposed to a negative or positive pressure to remove gas within the porous structure and to drive the liquid into the microstructure, respectively. By permitting the electrode to be exposed to the entire homogenous solution at the same time, the desired amount of inorganic nano-catalyst may be controlled precisely due to the predictable deposition rate. Moreover, both electrodes could be infiltrated at the same time with the catalyst precursor, such that with the proper selection of the catalyst composition, the oxidation/reduction processes of the electrochemical cell may be modified and/or enhanced simultaneously.

As described above, the advantages for using this bio-templating enhanced deposition process was to increase the amount of deposited/infiltrated/impregnated catalyst and secondly, to pin the catalyst to the pore walls by the spontaneous self-adhesive feature of catechol-based molecules; therefore, the migration of cations from deep microstructure region to the surface during drying was prevented. In published literature, these "bio-adhesives" have been used to only coat two-dimensional substrates, but never three-dimensional porous networks that are composed of more than one solid phase or chemistry (such is typical for solid-state electrochemical cells).

The defined parameters could be modified using the provided working mechanism as a basis for selection of an adequate substitute. Alternative catechol-based bio adhesive such as melanin could also be used for templating. Initial bio-adhesive content and dispersant mixture (alcohol, water) and immersion time could be modified to change the aggregate size and the final thickness of the bio-template. Different nano-catalyst cation sources could be also used as the precursor. Moreover, precursor compositions or alcohol/water ratios could be modified in order to lower or elevate the wetting characteristics of precursor. Initial precursor molarity, and coating (immersion) time can be modified in order to aim various final catalyst loading. Pressure and vacuum assistance could be applied to enhance the deposition rate of nano-catalyst. Calcination temperature could be modified to control the final particle size of impregnated nano-catalysts. Finally, the chemistry and the stoichiometry of the catalysis can be modified for the utilization of different types of fuel candidates or depending on the target electrode (anode and/or cathode). Through the presented technology, the nano-catalyst can be multiple component metal (such as mono-, bi-, and tri-component composites or alloys) or oxide nano-particles.

The technical descriptions and constraints of the process are as follows:

1. The porosity of the candidate electrode for infiltration should consist of a percolated open structure (can be as low as 25% porosity level);

2. If the candidate electrode is infiltrated by drip-coating method, the bio-template and catalyst precursor solutions must be dripped to completely cover the active electrode boundary which is typically the smallest electrode surface area;

3. If the candidate electrode is infiltrated by dip-coating method, the cell (or the whole cell) must be completely immersed and covered by the bio-template and catalyst precursor solutions stepwise;

4. The final poly-catechol aggregate size is very crucial for bio-template protocol of 3D porous architectures. Depending on the percolation and the percentage of the pore ratio, the final aggregate size must be lower than 150-250 nm (particle size). Final aggregate size can be tuned by solid concentration (varying 0.25 to 2 mg/ml), water/organic medium ratio (varying 100% water to 25% water/75% organic medium such as ethanol by volume);

5. Poly-catechol polymerization is very susceptible to pH drifts. A buffering agent, such as TRIS, tris(hydroxymethyl) aminomethane), should be used to fix the pH at a desired point;

6. After polymerization, the aggregate size of the poly-catechol species must not be equal or higher than the average pore size (such as in most commercial SOFCs, >100 nm). Above this range, few polymerized catechol based bio-molecule particles can clog the open pores and prevents the effective infiltration for both bio-templating and nano-catalyst solution impregnation steps;

7. When the whole cell or only one electrode is immersed to the solution, the system must be exposed to a vacuum to evacuate air imprisoned in the 3-D porous structure; otherwise, the air entrapped gas acts as a barrier layer for the infiltration. Depending on the thickness and the surface area of the cell, the amount needed for the vacuuming may change but it should be at least 5 minutes under 30 mm Hg;

8. Polymerized poly-catechol solution tends to sediment under stagnant conditions which cause local inhomogeneity inside the solution. To prevent this, the system should be tilted, strongly preferred on the rocker table. The frequency of the rocker table should be between 30-45 rpm;

9. After bio-templating, treated surface(s) should be rinsed with the clear solution of the same ethanol-water ratio of bio-template solution. The reason for doing this is to clean the surface for the loosely bonded bio-aggregates;

10. Nano-catalyst infiltration is followed by the drying step. The cell can be dried in a heated oven. The temperature of the oven must not exceed over the ignition temperature of solvent in the presence of the catalyst. For example, 150-180° C. for cerium based catalysis and ethanol; and 11. The calcination temperature must be higher than the decomposition temperature of the catalyst source.

Figure 1:
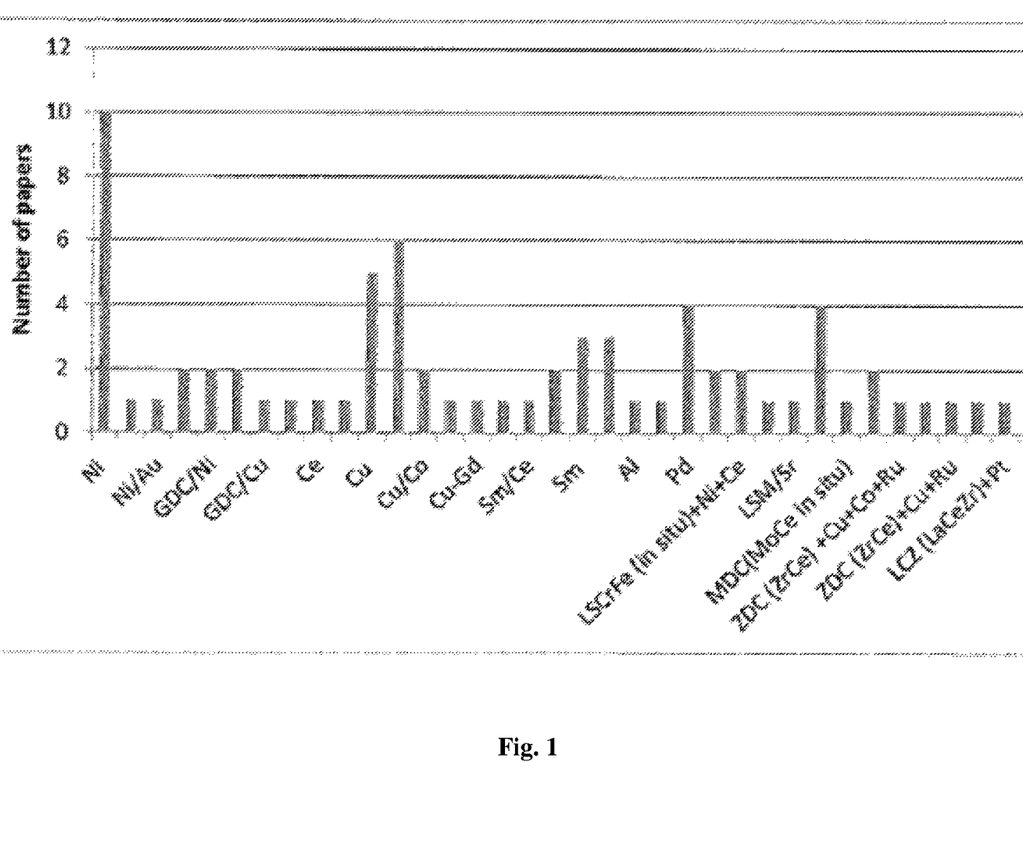
FIG. 1 shows the number of papers of recent impregnation/infiltration studies on SOFC electrodes.

The present invention improves the electrode performance, and hence the overall performance, by infiltration/impregnation of nano-particles within the electrode microstructure, which increases the catalytic activity and redox reaction rates. By using the high surface area of the nano-particles, the triple phase boundary (TBP) length and activity may be enhanced, which is typically reflected in a decrease in the polarization resistance. In FIG. 1, recent impregnation/infiltration studies varying single to multi-cations, precious to conventional catalysis are tabulated. Current impregnation (infiltration) protocols often requires multiple steps to achieve adequate amount of nano-catalyst deposition within the electrochemical cells.

Deposited catalyst loading is commonly measured by the weight difference and the amount is ranked in various units such as nano-catalyst amount over electrode surface area ($mg/cm^2$), volume ($mg/cm^3$, $mmol/cm^3$) or weight percent (mg/g percentage). For example, one study was on the impregnation of samarium doped ceria (SDC) on NiO/SDC anode, optimum catalyst loading was reached after 7 infiltration cycles (20 $mg/cm^2$). However, the performance of the 9th cycle infiltrated cell (25 $mg/cm^2$) showed lower performance than the 5th cycle infiltrated cell (15 $mg/cm^2$). Showing lower performance implied the thicker SDC coating on the nickel particles in the anode may block the gas diffusion to the TPB region. Similar profile can be seen in a study on impregnating SDC, $Sm_2O_2$, $CeO_2$ and $Al_2O_3$ to Ni-based anodes (Liu et al., J. Solid State Electrochem, 2012). In all attempts, the maximum current density enhancement provided at the 4th cycle infiltrated cells which corresponds to 1.40-1.71 $mmol/cm^3$ catalyst loading. Preferably a loading dose of from about 0.5 mg to about 4.5 mg of the nanocatalyst is employed. In a different perspective, one study was aimed to observe the effect of catalyst precursor molarity ranging from 0.5 M to 2.5 M on the performance by a single step infiltration (Timurkutluk et al., Int. J. Energy. Res., 2011). At the end, the final deposition amount was not mentioned, but the results showed that the performance of the cell enhanced by the deposited catalyst and reached 71% higher power density than the unimpregnated baseline cell, when high molarity precursor solution is used (1.5 M). The cells impregnated with 2 and 2.5 M monitored lower maximum power densities than the baseline due to the pore clogging and limiting the gas flow and electrical conductivity.

Figure 2:
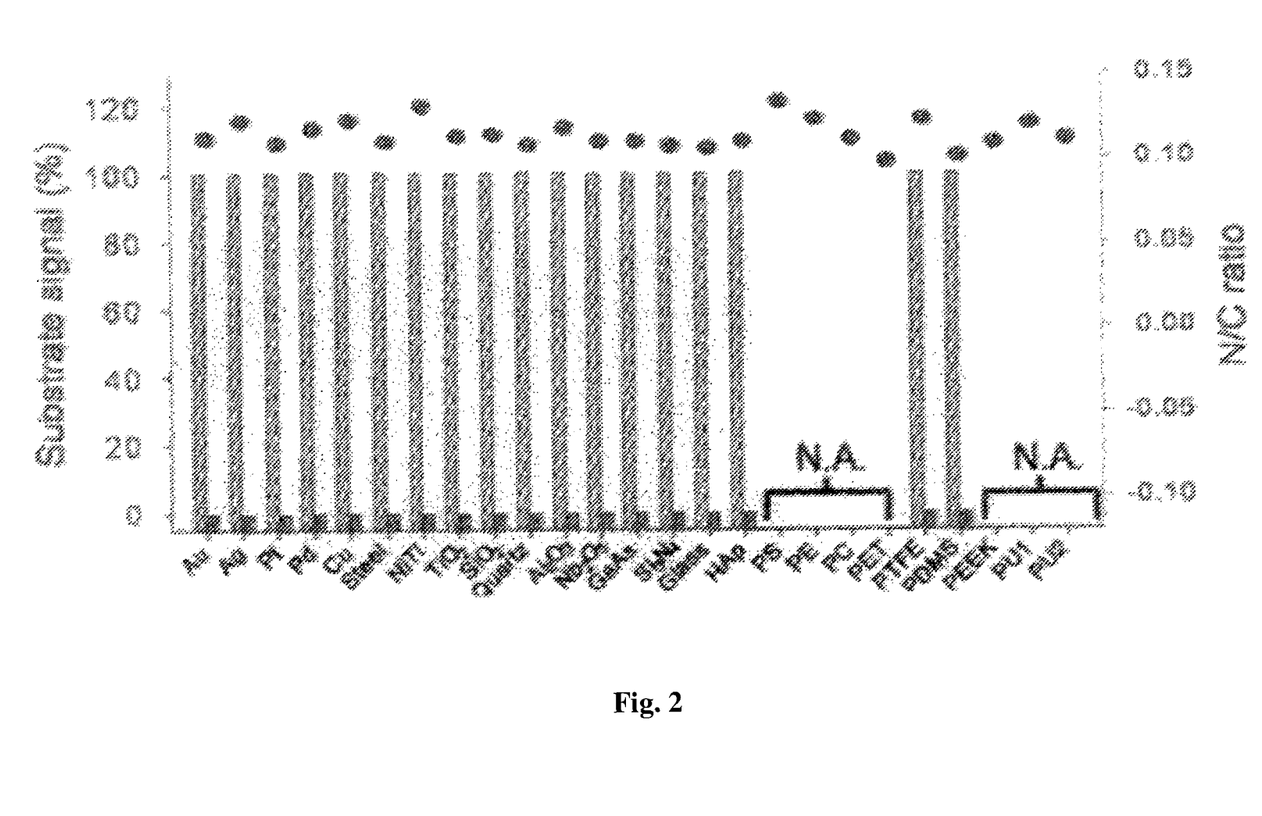
FIG. 2 shows an XPS characterization of twenty five (25) different poly-dopamine coated surfaces before and after coating by poly-dopamine.

In an embodiment of the process of the present invention, three-dimensional architecture of the electrode (or the whole cell) is templated by the bio-adhesive molecules in the first step (of a two-step process, which includes the singular organic template impregnation step and the singular nano-catalyst impregnation step). The process achieves a monolayer adhesive coating over the pore walls of single/multi component electrodes homogenously. The catechol-based bio-molecules (such as for example, but not limited to, poly-dopamine, poly-norepinephrine) are bio-mimicked materials typically seen in marine mussels. These adhesive proteins undergo spontaneous polymerization in marine conditions (alkaline medium) by a facile and versatile process. FIG. 2 shows that the adhesive effect of poly-catechol film can bind to various substrates regardless of its chemistry (Lee et al., Science, 2007). As it is seen, dopamine deposited/bonded over the substrate after sometime that no substrate signal can be gained by XPS. To be more specific, the chemisorption between the bio-template and electrode, multi-metal oxide surface, is reported to initiate via the coordination interaction between the metal ion(s) and the catechol group. During the catalyst precursor dip-coating step, the deposited poly-dopamine template located on the pore walls binds with mono- or multi-metal ions via chelation. In one study, $Cu^{+2}$ was stated to bind with either phenolic hydroxyl groups or nitrogen ligands depending on neutral to alkaline medium conditions (Liu et al, J. Am. Chem. Soc., 2014). By bio-templating of this invention, the nano-catalyst precursor infiltration can be performed efficiently since the dissolved catalyst cation(s) can attach to the bio-template layer and pin to that position. In that way, the drying process does not pull the nano-particle from the original deposited position to the surface during drying (by capillarity action). As an example, experiments were performed to form cerium dioxide (CeO2) nano-catalyst particles, which the performance enhancement effect has been proven for SOFC (Gorte et al., J. Power Sources, 2002). In that manner, cerium source raw materials, such as cerium nitrate hexahydrate, cerium chloride, etc., were used. As depicted above, the bio templating method of this invention can be applied to surfaces to different chemistries and coating nano-particles.

The technology described here introduces a bio-template assisted dip-coating process for infiltration/impregnation of the nano-catalyst within the electrode microstructure. Bio-template method has been mostly utilized for 2D smooth surfaces. Only few studies have been assessed on coating of 3D architectures such as membranes or biomaterial scaffolds. The common structure of PDA coated 3D architecture is being single solid chemical phase with the high porosity values up to 40% (Ryou et al., Adv. Mater., 2011) to 85% with large pore size (300 µm) (Wu et al., J. Mater. Chem, 2011). The success of bio-templating of 3-D architecture membranes owes not only to have highly open structure, large pore size, but also to the thin structure (typically 25 µm-100 µm) and infiltration to the two faces by dip-coating which decreases the infiltration depth by two times. After the application of polymerized poly-catechol adhesive, the surface can attract any type of dopant and/or coating regardless of its chemistry. With the present technology, the homogenous bio-templating layer, covering evenly over the multi-phase 3D pore network, leads to an homogenous nano-catalyst coating over the same pore surface, where the infiltrated nano-catalyst remains pinned during drying (without segregation to the surface). In the end, the bio-template is easily removed by thermolysis and the nano-catalyst is bonded to the pore wall through typical sintering processes.

Conventional infiltration/impregnation protocols are basically performed in multiple repetitions of the same dripping method until the desired catalyst loading is achieved. The dripping method includes the simple process of dripping or pipetting a salt solution onto the surface of the electrode, where capillary action and gravity forces the salt solution into the porous electrode. The precipitation of the nano-catalyst typically occurs when the cell is permitted to dry; the change in the super-saturation level is altered during this drying process (leading to precipitation at the drying surface). This process takes multiple days and requires a significant number of sequential dripping and drying steps (typically 5-15 dripping and drying steps). In addition, due to the preferential drying at the surface of the electrode, the nano-catalyst is preferentially precipitated at the surface resulting in the blockage of the porosity in this location and the inhomogeneous deposition of the nano-catalyst (where there is a gradient identified from the surface to the electrolyte interface). Typically, rapid drying kinetics of the small amount (few milliliters) of liquid precursor also does not permit sufficient time for effective wicking of the catalyst through the surface blocked pores in following steps.

In the present invention, the two-step process was originally utilized to deposit coatings onto two-dimensional, smooth surfaces. This process was modified for the impregnation of complex nano-catalyst into the three-dimensional porous network of an electrochemical electrode. The technology of the present invention solves the existing problems that are depicted above. By using the bio-template assisted dip-coating process of this invention, the impregnation efficiency can be increased in terms of catalyst loading in a single nano-catalyst deposition step (with only one drying step). In addition, the control of the overall nano-catalyst deposition concentration (or thickness) and drying segregation (inhomogeneity) is controlled using the present process/method.

Bio-templating impregnation has three distinct advantages over other impregnation processes, as follows:

1. The method is not dependent upon the chemistry or wetting characteristics of the substrate or deposited material (nano-catalyst);

2. The adhesive effect of the bio-template surface modifier permits the pinning of the nano-catalyst after deposition and restricts migration during solvent drying; and 3. The deposition rate of the nano-catalyst is consistent (with control of temperature, pressure, and solution concentration) which leads to distinct control of the film thickness.

Figure 3:
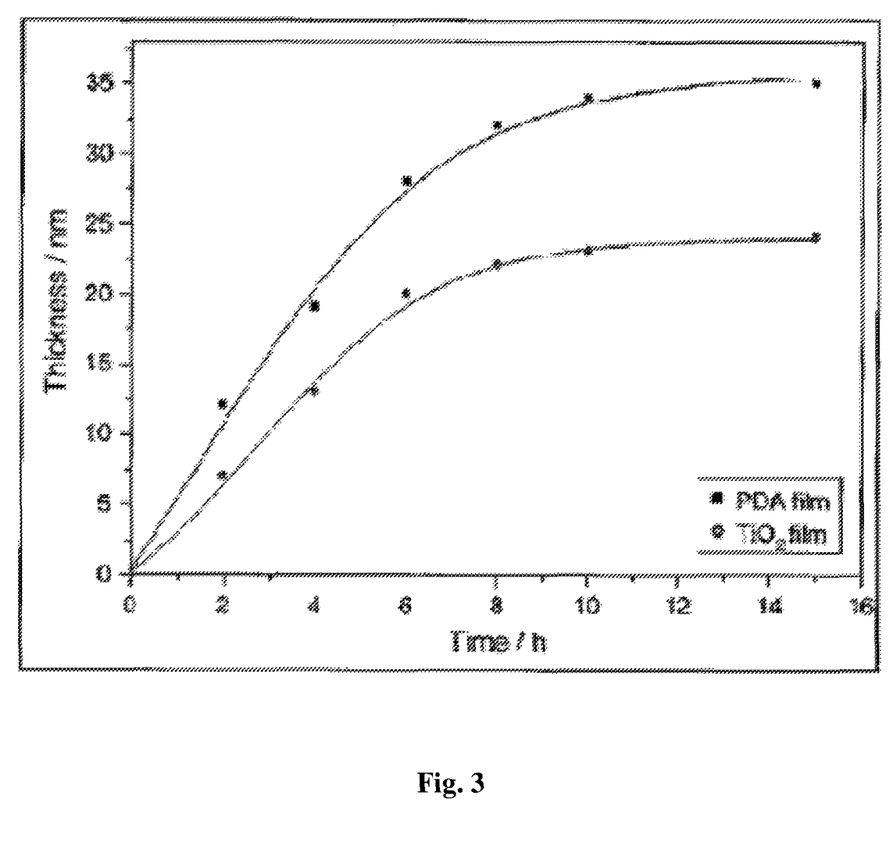
FIG. 3 shows the dependence of the poly-dopamine (PDA) and $TiO_2$ film thickness (nm) on the time (in hours) of polymerization.

By the implementation of bio-templating, substrates with various chemistries can be templated for different purposes. Secondly, after templating, again various materials ranging from proteins and DNA to various inorganic nano/macro particles can be deposited. More for the application side, the adaptation of this step to SOFC electrodes brings the pinning of nano-catalyst particles into the 3D architecture of the electrode(s) by weak attractive forces. These two functions have proven to be successful and versatile due to the catechol-based templating method. The fourth need for infiltration studies is controlling the deposition amount. FIG. 3 displays that bio-template and catalysis deposition rate is proportional to initial concentration and exponentially decreasing function of the reaction time. Hence, various architectures can be templated and infiltrated with desired amount of nano-catalyst (Zheng et al., Thin Solid Films, 2012).

Data and Results

For prior infiltration experiments, the technology of the present invention was applied to commercial anode-supported SOFCs. As set forth in FIG. 4, it is noted that by changing the poly-dopamine (PDA) concentration, the deposited catalyst amount changed and demonstrated a significantly higher deposition level over that without the bio-template surface modifier. A 0.5 mg/ml PDA solid loading was found to be the most optimal loading, where the final catalyst deposition level was 6.5 times higher than the infiltration process that used no poly-dopamine template. Below 0.5 mg/ml concentration, the effect of the poly-dopamine template was found not to have a significant effect on the overall deposition amount, where the deposition level of the nano-catalyst was in the similar range as the samples processed with no PDA. Catalyst deposition of 0.25 mg/ml PDA treated cell was 1.5 mg (0.5 mg/ml PDA had 6.5 mg catalyst loading). It is believed that the effect begins after 0.25 mg/ml PDA.

Figure 4:
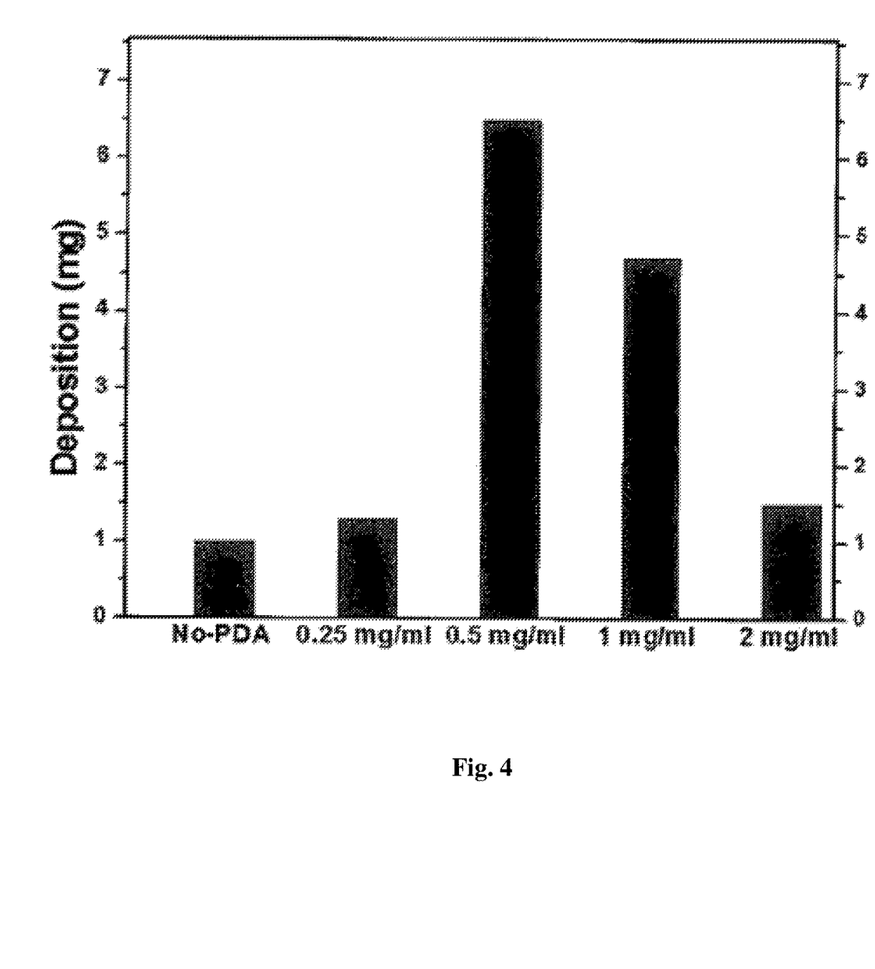
FIG. 4 shows the influence of poly-dopamine concentration on the deposited $CeO_2$ catalyst within a commercial anode-supported SOFC after bio-templated and dip-coated infiltration process of this invention.

The reason for getting a lower deposition rate at higher PDA concentrations was probably due to the spontaneous PDA aggregation, during continuous self-polymerization process. The PDA aggregates were found to block efficient infiltration of the catalyst precursor within the electrode structure during the dip-coating process.

Figure 5:
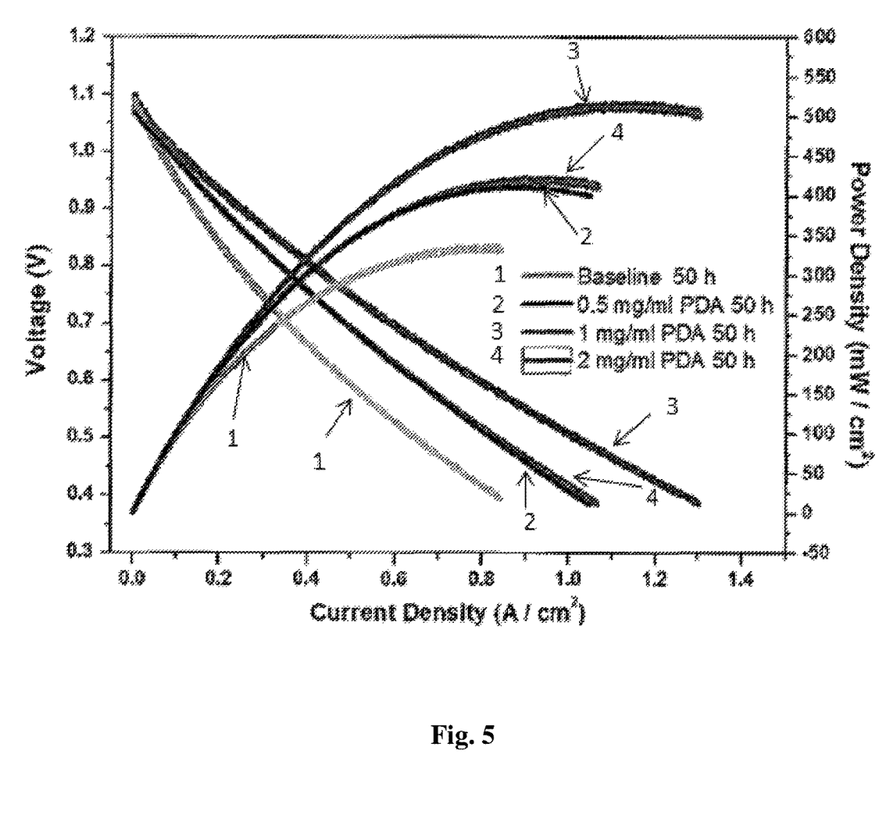
FIG. 5 shows a current-voltage plot of various concentrations of poly-dopamine (PDA) template and Ce infiltrated electrochemical cells using the process of this invention.

In FIG. 5, current-voltage plot of the 0.5 mg/ml PDA templated and Ce infiltrated electrochemical cells showed the lowest enhancement among the infiltrated cells, due to the overloaded catalyst level within the porosity which affected the gas diffusion rate. In the case of cells processed with a 1 mg/ml PDA template concentration, the Ce infiltrated cell showed a 51% higher performance over the baseline cell, where the total nano-catalyst loading with this templating concentration was 4.5 mg $CeO_2$ (completed again, using the two-step process). These experiments showed that the adhesive property of bio-template had a very big influence on catalyst deposition in comparison to the conventional dip-coating method under the same conditions and parameters.

The present invention's infiltration process on Solid Oxide Fuel Cells (SOFC's) can be applied to introduce nano-catalyst into the anode, cathode or both sides of SOFC electrodes. In that case, suitable metallic and metallic alloys (such as, but not limited to, Co, Mo, Pd, Pt, Ce, Ag, Ni, Cu, Ru, Rh) and metal oxide (such as, but not limited to, $CeO_2$, $Al_2O_3$, CaO, $La_xSr_yO_3$) nano-catalysts as oxidation/reduction enhancing catalyst, internal reforming catalyst, grain growth inhibitors, and contaminant catalyst can be infiltrated. This allows the flexibility of fuel choice such as, hydrogen, methane, and coal syngas; in addition, the long-term stability may be controlled with precise nano-catalyst selection, as well as, an increase in electrochemical performance. The key is that the process of this invention may be applied to existing commercial SOFCs without the manufacturing needing to alter their current product's microstructure (and thus, major processing methods and materials).

The process set forth herein can be added to any existing products. Little to no limitations exist for controlling the agglomerate size of polymerized dopamine or similar bio-template chemistries using the processes of this invention.

This process of this invention may be implemented for a variety of types of electrochemical cell applications, for example, but not limited to, the following:

1. Specific nano-catalysts for utilization of various fuel types such as for example, but not limited to, shale gas, and natural gas;

2. Sizes/geometry SOFC and solid oxide electrolysis cells (SOECs) such as for example, but not limited to, planar, and tubular cells; and 3. SOFC's types such as for example, but not limited to, electrolyte, cathode or metal supported SOFC's.

All solid-oxide fuel cell (SOFC) commercial providers and/or manufacturers shall be interested in the process of this invention to enhance the performance of their existing technology without alteration to their current product.

In the examples provided herein the following materials were employed: Dopamine hydrochloride (99%) and Cerium (HI) nitrate hexahydrate (REacton®, 99.5% (REO) and TRIS buffer (Tris(hydroxymethyl)aminomethane, 99%) were purchased from Alfa Aesar. Epinephrine hydrochloride was purchased from Sigma Aldrich. Anode supported fuel cells (ASC-2.7, NexTech Materials, Ltd.) were purchased from Fuel Cell Materials. Reagent grade of nitric acid and ammonium hydroxide were used to shift the pH of dopamine or epinephrine solution. Nalgene® polyethersulfone syringe filter with 0.2 μm (Thermo Scientific) was used to filter polymerized poly-catechol solution.

In one embodiment of the invention, a process incorporates at least one nanocatalyst on the surface of and within a plurality of pores of an electrode by impregnating an electrode comprising pores with a plurality of catechol-based biomolecules to form a treated electrode having a bio-template layer; and then impregnating the treated electrode with at least one nano-catalyst; and then removing the bio-template layer by performing thermolysis upon the treated electrode for forming at least one nano-catalyst bonded on the surface and within the pores of the electrode.

In some embodiments, the electrode is impregnated with the plurality of catechol-based biomolecules by dipping the electrode into a solution comprising the plurality of catechol-based biomolecules.

In some embodiments, the electrode is impregnated with the plurality of catechol-based biomolecules by dripping a solution comprising the plurality of catechol-based biomolecules into the pores of the electrode.

In some embodiments, the treated electrode is rinsed with a solvent after the treated electrode is impregnated with the plurality of catechol-based biomolecules and before the treated electrode is impregnated with the at least one nano-catalyst.

In some embodiments, the treated electrode is impregnated with the at least one nano-catalyst by dipping the treated electrode into a salt solution comprising the at least one nano-catalyst.

In some embodiments, the treated electrode is impregnated with the at least one nano-catalyst by dripping a salt solution comprising the at least one nano-catalyst into the pores of the electrode.

In some embodiments, the treated electrode is impregnated with the at least one nano-catalyst and before the bio-template layer is removed from the treated electrode, the treated electrode is dried.

In some embodiments, the thermolysis is performed at a temperature that is less than 900 degrees Centigrade.

In some embodiments, the only impregnation steps are impregnating the electrode comprising pores with the plurality of catechol-based biomolecules to form the treated electrode having the bio-template layer; and then impregnating the treated electrode with the at least one nano-catalyst.

In some embodiments, the plurality of catechol-based biomolecules comprises poly-dopamine.

In some embodiments, the plurality of catechol-based biomolecules comprises poly-epinephrine.

In some embodiments, the plurality of catechol-based biomolecules comprises melanin.

In some embodiments, the catechol-based biomolecule comprises a compound that behaves like poly-dopamine and is selected from the group consisting of caffeic acid, DHC (d 3,4-dihydroxyhydrocinnamic acid), Tiron (4,5-dihydroxy-1,3 benzenedisulfonic acid disodium salt), gallic acid and celestine blue.

In some embodiments, the electrode is impregnated with from about 0.25 mg/ml to about 5 mg/ml loading of the plurality of catechol-based biomolecules, and preferably is from 0.50 mg/ml to about 2.0 mg/ml.

In some embodiments, the electrode is impregnated with from about 0.5 mg/mL to about 1 mg/mL loading of the plurality of catechol-based biomolecules.

In some embodiments, the electrode is impregnated with about 0.5 mg/mL loading of the plurality of catechol-based biomolecules.

In some embodiments, the treated electrode is impregnated with from 0.2 mg to 10 mg loading of all of the at least one nano-catalyst.

In some embodiments, the treated electrode is impregnated with from 0.5 mg to 7.0 mg loading of all of the at least one nano-catalyst.

In another embodiment of the invention, an electrode comprises a plurality of pores and at least one nanocatalyst, wherein the at least one nanocatalyst is bonded on the surface and within the pores of the electrode by impregnating the electrode with a plurality of catechol-based biomolecules to form a treated electrode having a bio-template layer; and then impregnating the treated electrode with the at least one nano-catalyst; and then removing the bio-template layer by performing thermolysis upon the treated electrode.

In some embodiments, the electrode is loaded with from 0.2 mg to 10 mg of all of the at least one nano-catalyst.

In some embodiments, the plurality of catechol-based biomolecules comprises at least one selected from the group consisting of poly-dopamine, poly-epinephrine, and melanin. Other embodiments include wherein the catechol-based molecule comprises a compound that behaves like poly-dopamine and is selected from the group consisting of caffeic acid, DHC (d 3,4-dihydroxyhydrocinnamic acid), Tiron (4,5-dihydroxy-1,3 benzenedisulfonic acid disodium salt), gallic acid and celestine blue.

It will be appreciated by those persons skilled in the art that changes could be made to the embodiments described herein without departing from the broad inventive concept thereof. It is understood, therefore, that this invention is not limited to the particular embodiments disclosed, but is intended to cover modifications that are within the spirit and scope of the invention, as defined by the appended claims.

What is claimed is:

1. A process for incorporating at least one nanocatalyst on the surface of and within a plurality of pores of an electrode comprising:
   impregnating an electrode comprising pores with a plurality of catechol-based biomolecules to form a treated electrode having a bio-template layer; and then
   impregnating said treated electrode with at least one nano-catalyst; and then
   removing said bio-template layer by performing thermolysis upon the treated electrode for forming at least one nano-catalyst bonded on the surface and within the pores of said electrode.

2. The process of claim 1 wherein said electrode is impregnated with the plurality of catechol-based biomolecules by dipping said electrode into a solution comprising the plurality of catechol-based biomolecules.

3. The process of claim 1 wherein said electrode is impregnated with the plurality of catechol-based biomolecules by dripping a solution comprising the plurality of catechol-based biomolecules into said pores of said electrode.

4. The process of claim 1 wherein said treated electrode is rinsed with a solvent after said treated electrode is impregnated with the plurality of catechol-based biomolecules and before said treated electrode is impregnated with the at least one nano-catalyst.

5. The process of claim 1 wherein said treated electrode is impregnated with the at least one nano-catalyst by dipping said treated electrode into a salt solution comprising the at least one nano-catalyst.

6. The process of claim 1 wherein said treated electrode is impregnated with the at least one nano-catalyst by dripping a salt solution comprising the at least one nano-catalyst into said pores of said electrode.

7. The process of claim 1 wherein after said treated electrode is impregnated with the at least one nano-catalyst and before said bio-template layer is removed from said treated electrode, said treated electrode is dried.

8. The process of claim 1 wherein the thermolysis is performed at a temperature that is less than about 1000 degrees Centigrade.

9. The process of claim 1 comprising a plurality of impregnation steps, wherein the plurality of impregnation steps consist essentially of
   impregnating said electrode comprising pores with the plurality of catechol-based biomolecules to form said treated electrode having said bio-template layer; and then
   impregnating said treated electrode with the at least one nano-catalyst.

10. The process of claim 1 wherein the plurality of catechol-based biomolecules comprises poly-dopamine.

11. The process of claim 1 wherein the plurality of catechol-based biomolecules comprises poly-epinephrine.

12. The process of claim 1 wherein the plurality of catechol-based biomolecules comprises melanin.

13. The process of claim 1 wherein the plurality of catechol-based biomolecules comprises a compound that behaves like poly-dopamine and is selected from the group consisting of caffeic acid, DHC (d 3,4-dihydroxyhydrocinnamic acid), Tiron (4,5-dihydroxy-1,3 benzenedisulfonic acid disodium salt), gallic acid and celestine blue.

14. The process of claim 1, wherein said electrode is impregnated with from about 0.25 mg/ml to about 5 mg/ml loading of the plurality of catechol-based biomolecules.

15. The process of claim 1, wherein said electrode is impregnated with from about 0.5 mg/ml to about 2 mg/ml loading of the plurality of catechol-based biomolecules.

16. The process of claim 1, wherein said treated electrode is impregnated with from 0.2 mg to 10 mg loading of all of the at least one nano-catalyst.

17. The process of claim 1, wherein said treated electrode is impregnated with from 0.5 mg to 7 mg loading of all of the at least one nano-catalyst.

18. The process of claim 1, wherein the plurality of catechol-based biomolecules comprises at least one selected from the group consisting of poly-dopamine, poly-epinephrine, melanin, and a compound that behaves like poly-dopamine that is selected from the group consisting of caffeic acid, DHC (d 3,4-dihydroxyhydrocinnamic acid), Tiron (4,5-dihydroxy-1,3 benzenedisulfonic acid disodium salt), gallic acid and celestine blue.

* * * * *